US011619576B2

(12) United States Patent
Kiyono et al.

(10) Patent No.: US 11,619,576 B2
(45) Date of Patent: Apr. 4, 2023

(54) CORROSIVE SUBSTANCE DETECTION USING HYDROPHILIC GEL FOR IMPROVED CORROSION EXPOSURE DETECTION IN ELECTRONIC DEVICES

(71) Applicant: International Business Machines Corporation, Armonk, NY (US)

(72) Inventors: Satsuo Kiyono, Yokohama (JP); Eric V. Kline, Pine Island, MN (US); Carlo Gonzales Gagui, Manila (PH); Chiaki Oishi, Kanagawa (JP); Wen Ming Lim, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 454 days.

(21) Appl. No.: 16/793,247

(22) Filed: Feb. 18, 2020

(65) Prior Publication Data

US 2021/0255090 A1    Aug. 19, 2021

(51) Int. Cl.
*G01N 17/04* (2006.01)
*G01N 27/04* (2006.01)

(52) U.S. Cl.
CPC ........... *G01N 17/04* (2013.01); *G01N 27/041* (2013.01)

(58) Field of Classification Search
CPC .............................. G01N 17/04; G01N 27/041
See application file for complete search history.

(56) References Cited

U.S. PATENT DOCUMENTS

| 5,786,439 | A | * | 7/1998 | Van Antwerp | ..... A61B 5/14865 427/2.12 |
| 8,161,794 | B2 | | 4/2012 | Otsuki et al. | |
| 9,448,219 | B2 | | 9/2016 | Arora et al. | |
| 2004/0063215 | A1 | | 4/2004 | Horiuchi et al. | |
| 2011/0210014 | A1 | * | 9/2011 | Garosshen | ........... G01N 27/121 205/775.5 |

FOREIGN PATENT DOCUMENTS

| CN | 102661835 B | 6/2014 |
| JP | 2018200174 A | 12/2018 |

* cited by examiner

*Primary Examiner* — Jay Patidar
(74) *Attorney, Agent, or Firm* — Cantor Colburn LLP; Tihon Poltavets

(57) ABSTRACT

Techniques for corrosive substance detection for electronic devices are described herein. An aspect includes applying an electrical bias to a detector structure of a corrosive substance detector, wherein a layer of a hydrophilic gel is located over an electrode of the detector structure. Another aspect includes monitoring a resistance of the detector structure. Another aspect includes, based on determining that the resistance of the detector structure has dropped below a minimum resistance, indicating exposure to a corrosive substance by the corrosive substance detector.

20 Claims, 7 Drawing Sheets

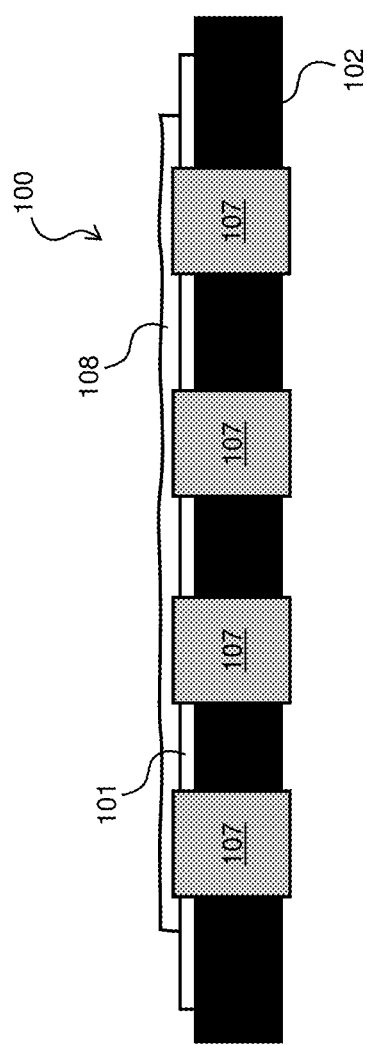

CORROSIVE SUBSTANCE DETECTION USING HYDROPHILIC GEL FOR IMPROVED CORROSION EXPOSURE DETECTION IN ELECTRONIC DEVICES

BACKGROUND

The present invention generally relates to electronic devices, and more specifically, to corrosive substance detection for electronic devices.

Corrosive substances may be present in relatively low-quality ambient air. Air containing corrosive substances may cause corrosion of metals, such as copper, that are used as conductors in electronic devices such as computer chips and printed circuit boards (PCBs). A metal may grow dendrites in the presence of a corrosive substance. Dendrite growth may cause shorts in an electronic device, which may render the electronic device inoperable. The Japan electronics and information technology industries association (JEITA) recommends not using electronic equipment in conditions in which a sulfur concentration of about 0.1 parts per million (ppm) in the ambient air is exceeded. The International Society of Automation (ISA) standard states that there is a risk of corrosion that could impact equipment reliability at a sulfur concentration of greater than 0.003 parts per million (ppm), and recommending against the use of electronic equipment in conditions in which sulfur concentration exceeds 0.01 ppm.

SUMMARY

Embodiments of the present invention are directed to corrosive substance detection for electronic devices. A non-limiting example method includes applying an electrical bias to a detector structure of a corrosive substance detector, wherein a layer of a hydrophilic gel is located over an electrode of the detector structure. The method also includes monitoring a resistance of the detector structure. The method also includes, based on determining that the resistance of the detector structure has dropped below a minimum resistance, indicating exposure to a corrosive substance by the corrosive substance detector.

Another non-limiting example method includes forming a detector structure of a corrosive substance detector on a base of an electrical device, wherein the detector structure comprises copper that is patterned on the base such that the detector structure comprises a gap in the copper. The method also includes applying a layer of a hydrophilic gel over an electrode of the detector structure, wherein the layer of the hydrophilic gel covers the gap Other embodiments of the present invention implement features of the above-described methods in a corrosive substance detector.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 1B is a side view of a corrosive substance detector in accordance with one or more embodiments of the present invention;

DETAILED DESCRIPTION

Figure 1A:
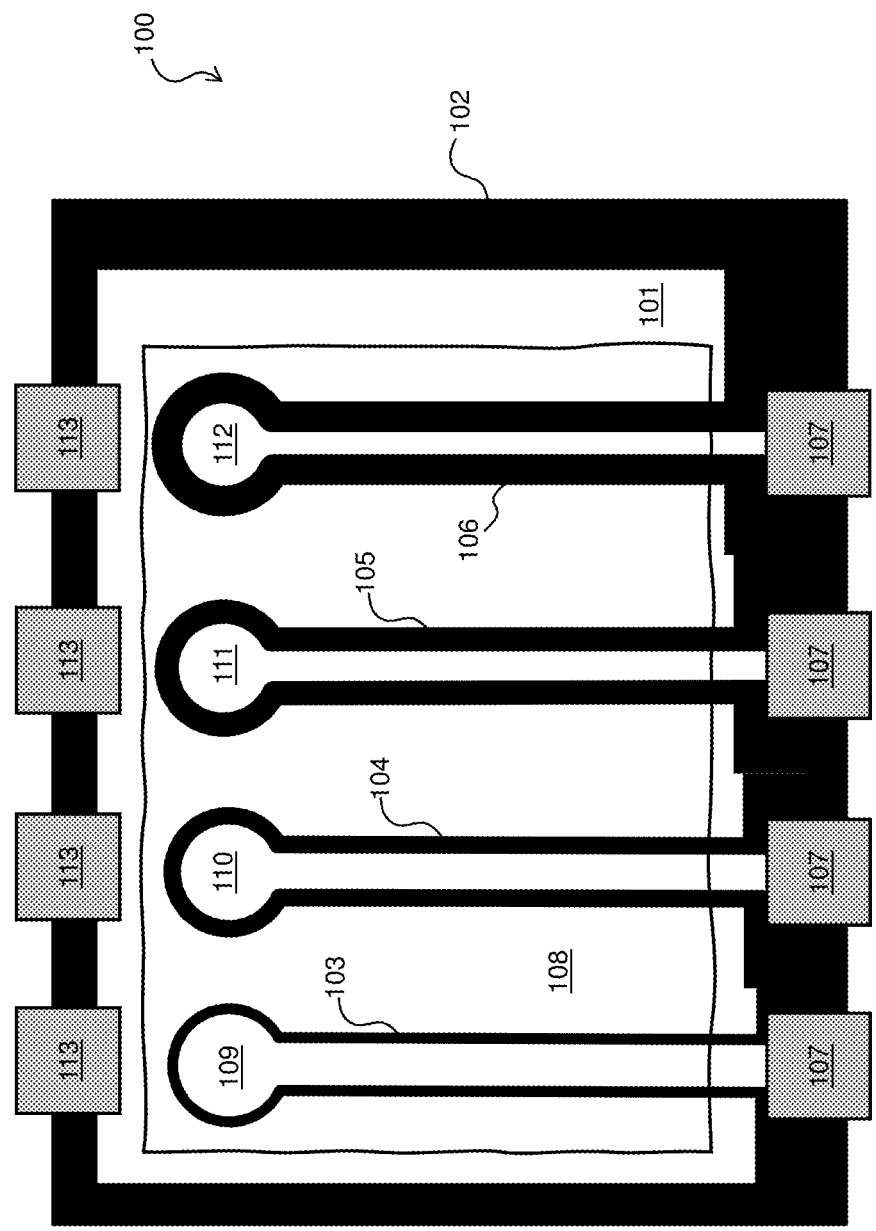
FIG. 1A is a top view of a corrosive substance detector in accordance with one or more embodiments of the present invention.

One or more embodiments of the present invention provide corrosive substance detection for electronic devices. Embodiments of a corrosive substance detector may be mounted on an electronic device, such as a computer chip or printed circuit board (PCB), and may monitor exposure to a corrosive substance (e.g., sulfur, chlorine, and/or nitrogen oxide) that is present in ambient air by the electronic device during operation. The corrosive substance detector may include a number of detector structures having graduated sizes. The detector structures may be formed by patterning a conductive metal that corrodes in the presence of a corrosive substance, such as copper, on a top surface of a base (e.g., ceramic or other dielectric material) of an electronic device. The detector structures may include an electrode portion and one or more contacts. In some embodiments, the electrode portion may be interdigitated. A location of a corrosive substance detector on an electronic device may be selected based on a likelihood of exposure, e.g., near an air intake of a computer system that includes the electronic device.

In some embodiments, the electrode portion of the detector structures of a corrosive substance detector may be covered with a layer of a hydrophilic gel. In various embodiments, the hydrophilic gel may include, but is not limited to, polyacrylamide, hydrogel, and active gel. When the hydrophilic gel is exposed to the corrosive substance in the ambient air, the hydrophilic gel may absorb an amount of corrosive substance that is related to an amount of the exposure. Over time, a concentration of the corrosive substance in the hydrophilic gel may gradually increase based on the exposure to the corrosive substance. The conductivity of the hydrophilic gel is proportional to the concentration of the corrosive substance (e.g., sulfur ions) that is suspended in the aqueous gel. Therefore, as the concentration of the corrosive substance in the hydrophilic gel increases, the conductivity of the hydrophilic gel may also increase, resulting in an increased leakage current in the detector structures of the corrosive substance detector. The hydrophilic gel coating may accelerate a dendrite reaction in the corrosive substance detector. The presence of the gel may allow gradual monitoring of corrosive substance exposure levels by the corrosive substance detector, as compared to corrosive substance detection based solely on dendrite growth in the metal comprising a detector structure, which may cause sudden shorts in the detector electrode portion.

Embodiments of a corrosive substance detector include multiple detector structures, each configured to detect a different level of corrosive substance exposure. A detector structure may include a gap in the metal that comprises the corrosive substance detector. Each detector structure in a corrosive substance detector may include a gap having a respective size. For example, a first detector structure, which may detect a lowest level of corrosive substance exposure, may include a gap having a width equal to a value of 0.4 W. W may have any appropriate value in various embodiments; in some embodiments, W may be about 1 millimeter (mm). A second detector structure, which may detect a higher level of corrosive substance exposure, may include a gap having a width equal to a value 0.6 W. A third detector structure, which may detect an even higher level of corrosive substance exposure, may include a gap having a width equal to a value 0.8 W. A fourth detector structure, which may detect a highest level of corrosive substance exposure, may include a gap having a width equal to a value W. In some embodiments, an electrical bias comprising a direct current (DC) bias is applied to the corrosive substance detector during operation; in some embodiments, the DC bias may be relatively small (e.g., about 100 microamperes; about 2.5 volts). The electrical bias may be any appropriate bias that is available in the electronic device in some embodiments. Initially, each detector structure may have a respective resistance R (e.g., about 100 megaohms MΩ)). Over time, as the corrosive substance detector is exposed to corrosive substances, R for each detector structure may drop. When R for a particular detector structure is detected to be below a minimum resistance (Rmin, e.g., about 1 MΩ), it may be determined that the electronic device containing the corrosive substance detector has experienced an amount of exposure corresponding to the particular detector structure. In various embodiments of a corrosive substance detector, W may have any appropriate value, and the corrosive substance detector may include any appropriate number of detector structures, each having any appropriate gap width.

Respective actions may be defined based on a determined amount of exposure, corresponding to each detector structure. For example, if the resistance of the first detector structure is detected to be below Rmin, preventive actions such as cleaning air intake areas may be performed, and cleanliness of air cooling intake and airflow paths inside a box frame and/or server room that includes the electronic device may be checked. If the resistance of the second detector structure is detected to be below Rmin, corrective actions like checking replacement parts availability, and checking maintenance plans and resources may be performed. A server air cooling intake may also be cleaned as part of the corrective actions. If the resistance of the third detector structure is detected to be below Rmin, immediate actions such as removing the system including the electronic device into a cleaner environment may be performed, and parts may be replaced as needed. If the resistance of the fourth detector structure is detected to be below Rmin, emergency actions may be taken, such as data evacuation, parts replacement, and shutting down the system for maintenance. An exposure warning or recommended action may be displayed to a user based on the monitoring of the resistances of the detector structures of the corrosive substance detector. Taking preventative actions before further substance exposure occurs may result in significant savings due to avoidance of shutdown and reduced cost of parts replacement.

FIG. 1A is a top view of a corrosive substance detector 100 for use in conjunction with an electronic device in accordance with one or more embodiments of the present invention. The corrosive substance detector 100 may be located on an electronic device, including but not limited to a computer chip, that includes a base 102. Base 102 be any appropriate dielectric material, including but not limited to ceramic. Copper 101 is patterned on top of the base 102 in a configuration that forms detector structures 103, 104, 105, and 106. The detector structures 103-106 include respective contacts comprising test pads 109, 110, 111, and 112. Portions of copper 101 that are located inside of the detector structures 103-106 are connected to terminals 107. Terminals 113 are connected to portions of copper 101 that are outside of the detector structures 103-106. A hydrophilic gel 108 is located on a top surface of the corrosive substance detector 100. The hydrophilic gel 108 covers the electrode portions of the detector structures 103-106, and does not cover the test pads 109-112. In various embodiments, the hydrophilic gel 108 may include, but is not limited to, polyacrylamide, hydrogel, and active gel.

Detector structures 103-106 include respective gaps in copper 101 on base 102. The gaps that make up detector structures 103-106 are configured to have varying widths, such that each detector structure of detector structures 103-106 may detect a different level of corrosion in copper 101. For example, in some embodiments, the gap corresponding to detector structure 106 may have a width W, detector structure 105 may have a width of about 0.8 W, detector structure 104 may have a width of about 0.6 W, and detector structure 103 may have a width of about 0.4 W. In some embodiments, W may be about 1 mm. In operation, a DC bias may be applied across terminals 107 and terminals 113 (e.g., terminals 107 may be power terminals, and terminals 113 may be ground terminals), and the resistance of each detector structure 103-106 may be separately monitored via test pads 109-112. Based on the resistance of any detector structure of detector structures 103-106 dropping below a minimum resistance (Rmin), an amount of corrosion of copper 101 and a corresponding amount of corrosive substance exposure may be detected. Operation of corrosive substance detector 100 is discussed in further detail below with respect to FIG. 3.

FIG. 1B is a side view of the corrosive substance detector 100 of FIG. 1A in accordance with one or more embodiments of the present invention. The side view of FIG. 1B is along a bottom side of the corrosive substance detector 100 that is shown in FIG. 1A. As shown in FIG. 1B, corrosive substance detector 100 includes base 102 with terminals 107 disposed along the side. Each of terminals 107 may correspond to a respective detector structure of detector structures 103-106. Copper 101 is patterned on top of base 102. Hydrophilic gel 108 is located on top of the corrosive substance detector 100.

Figure 1C:
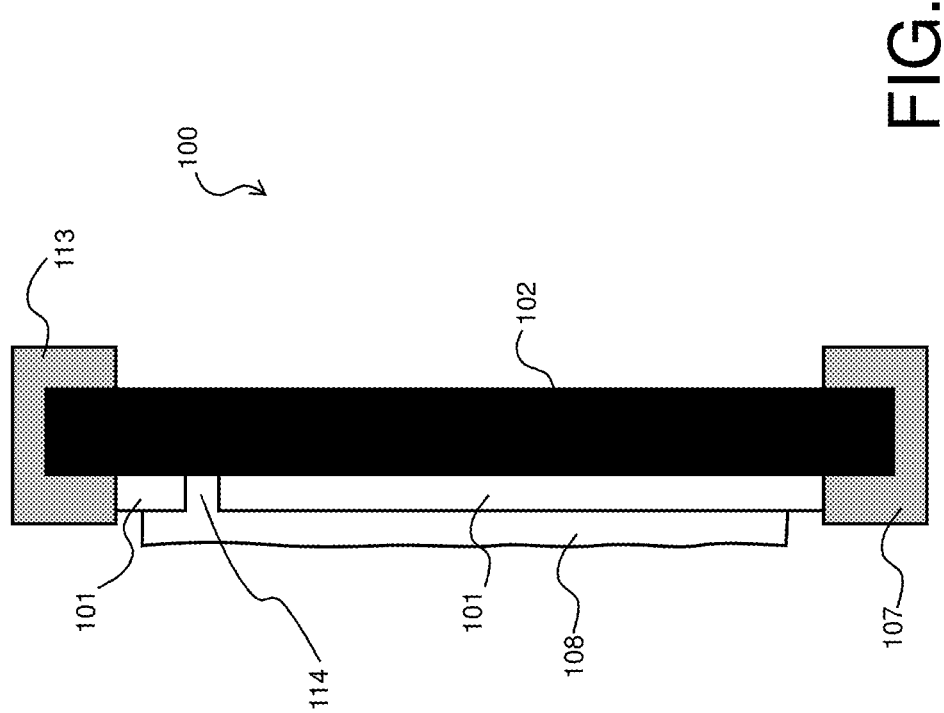
FIG. 1C is a side cross-section of a corrosive substance detector in accordance with one or more embodiments of the present invention.

FIG. 1C is a side cross section of the corrosive substance detector 100 of FIG. 1A in accordance with one or more embodiments of the present invention. The side view of FIG. 1C extends from terminal 113 to terminal 107 through a detector structure 103, and illustrates a gap 114 in copper 101 on base 102. Dendrite growth in copper 101 may cause gap 114 to be bridged, causing a short in the detector structure 103. Hydrophilic gel 108 covers a top portion of the corrosive substance detector 100.

It is to be understood that the block diagrams of FIGS. 1A-C are not intended to indicate that the corrosive substance detector 100 is to include all of the components shown in FIGS. 1A-C. Rather, the corrosive substance detector 100 can include any appropriate fewer or additional components not illustrated in FIGS. 1A-C (e.g., additional terminals, test pads, detector structures, chip structures or elements, etc.). Further, each detector structure of a corrosive substance detector 100 may include a respective gap having any appropriate width. Further, any appropriate voltage may be applied to a corrosive substance detector 100 during operation, and Rmin may have any appropriate value. Further, the embodiments described herein with respect to corrosive substance detector 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2A:
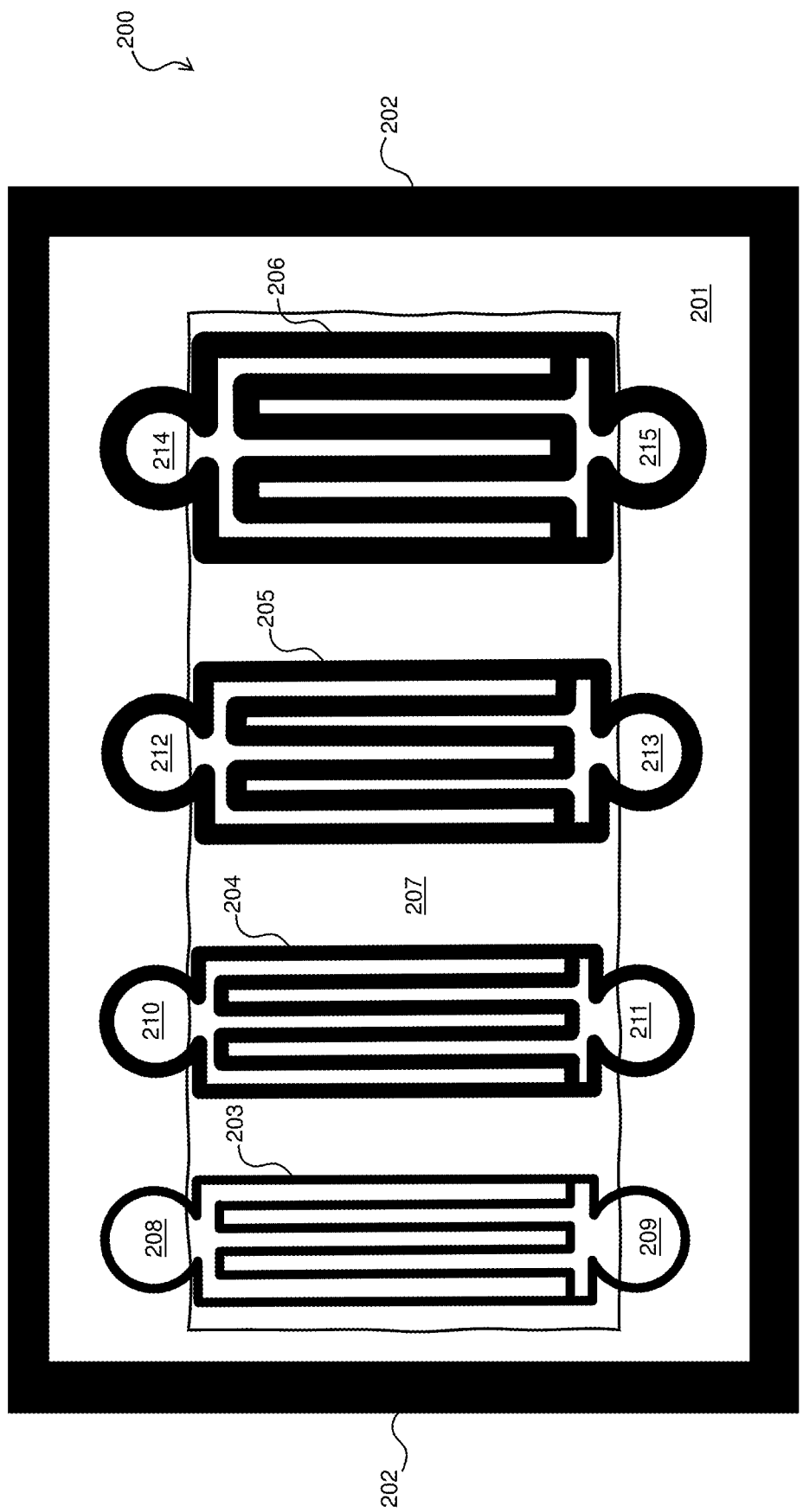
FIG. 2A is a top view of a corrosive substance detector in accordance with one or more embodiments of the present invention.

FIG. 2A is a top view of a corrosive substance detector 200 for use in conjunction with an electronic device in accordance with one or more embodiments of the present invention. The corrosive substance detector 200 may be located on an electronic device, including but not limited to a PCB, that includes a base 202. The base 202 may be any appropriate dielectric material, including but not limited to ceramic. Copper 201 is patterned on top of the base 202 in a configuration that forms detector structures 203, 204, 205, and 206. The electrode portions of detector structures 203-206 are each configured in an interdigitated manner. Detector structure 203 includes contacts comprising a power terminal 208 and ground terminal 209. Detector structure 204 includes contacts comprising a power terminal 210 and ground terminal 211. Detector structure 205 includes contacts comprising a power terminal 212 and ground terminal 213. Detector structure 206 includes contacts comprising a power terminal 214 and ground terminal 215. A hydrophilic gel 207 is located on a top surface of the corrosive substance detector. The hydrophilic gel 207 covers the electrode portions of detector structures 203-206, and does not cover the contacts 208-215. In various embodiments, the hydrophilic gel 207 may include, but is not limited to, polyacrylamide, hydrogel, and active gel.

Detector structures 203-206 include respective gaps in copper 201 on base 202. The gaps that make up detector structures 203-206 are configured to have varying widths, such that each detector structure of detector structures 203-206 may detect a different level of corrosion in copper 201. For example, in some embodiments, the gap corresponding to detector structure 206 may have a width W, detector structure 205 may have a width of about 0.8 W, detector structure 204 may have a width of about 0.6 W, and detector structure 203 may have a width of about 0.4 W. In some embodiments, W may be about 1 millimeter (mm). In operation, a DC bias may be applied across power terminals 208, 210, 212, and 214, and ground terminals 209, 211, 213, and 215, and the resistance of each detector structure 103-106 may be separately monitored. Based on the resistance of a detector structure of detector structures 203-206 dropping below a minimum resistance (Rmin), corrosion of copper 201 and a corresponding amount of corrosive substance exposure may be detected. Operation of corrosive substance detector 200 is discussed in further detail below with respect to FIG. 3.

Figure 2B:
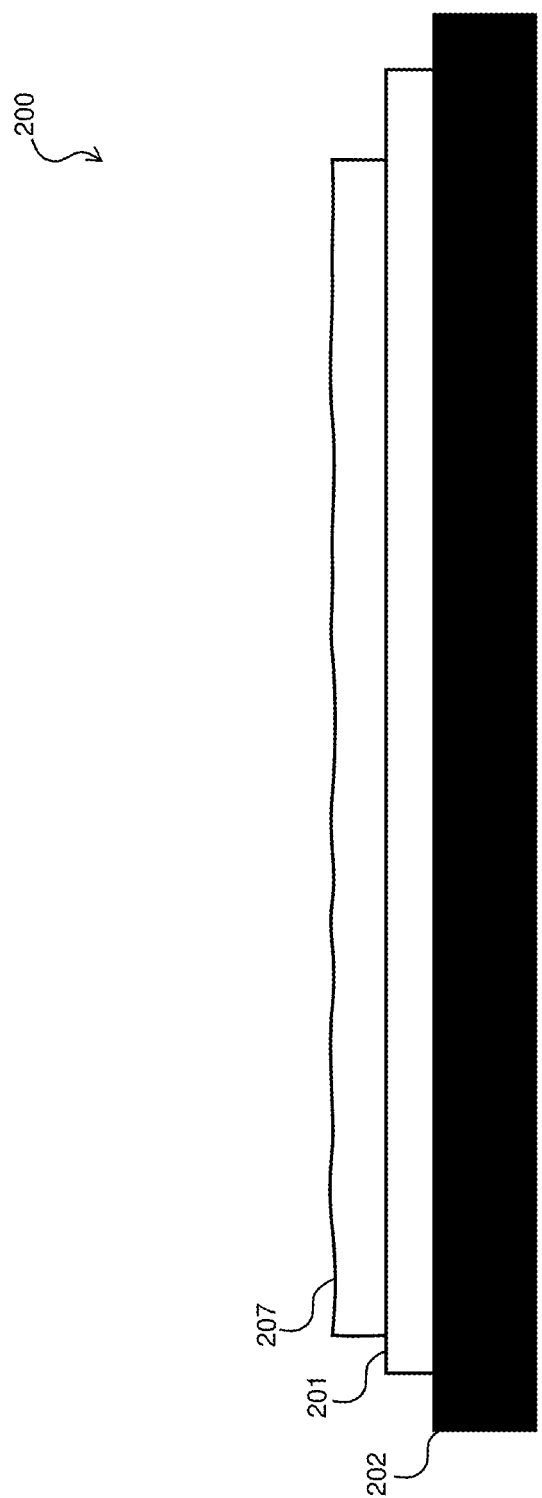
FIG. 2B is a side view of a corrosive substance detector in accordance with one or more embodiments of the present invention.

FIG. 2B is a side view of the corrosive substance detector 200 of FIG. 2B in accordance with one or more embodiments of the present invention. The side view of FIG. 2B shows copper 201 patterned on base 202. Hydrophilic gel 207 covers a top portion of the corrosive substance detector 200.

It is to be understood that the block diagrams of FIGS. 2A-B are not intended to indicate that the corrosive substance detector 200 is to include all of the components shown in FIGS. 2A-B. Rather, the corrosive substance detector 200 can include any appropriate fewer or additional components not illustrated in FIGS. 2A-B (e.g., additional terminals, test pads, detector structures, PCB structures or elements, etc.). Further, a detector structure of a corrosive substance detector 200 may include a gap having any appropriate width. Further, any appropriate voltage may be applied to a corrosive substance detector 200 during operation, and Rmin may have any appropriate value. Further, the embodiments described herein with respect to corrosive substance detector 200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 3:
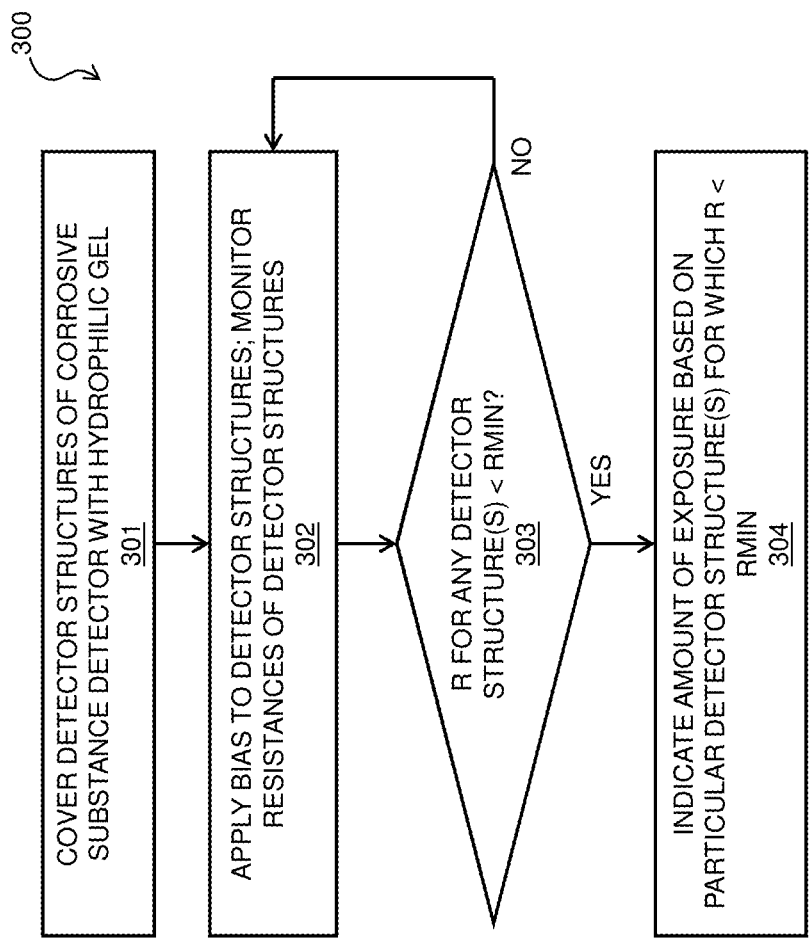
FIG. 3 is a flow diagram of a process for corrosive substance detection for electronic devices in accordance with one or more embodiments of the present invention.

FIG. 3 shows a process flow diagram of a method 300 for corrosive substance detection for electronic devices in accordance with one or more embodiments of the present invention. One or more embodiments of method 300 may be implemented in conjunction with embodiments of the corrosive substance detector 100 of FIGS. 1A-C or the corrosive substance detector 200 of FIGS. 2A-B. Method 300 may be implemented in conjunction with any appropriate computer system, including but not limited to computer system 400 of FIG. 4. In block 301 of method 300, an electrode portion of any detector structure of a corrosive substance detector, such as corrosive substance detector 100 of FIGS. 1A-C, or corrosive substance detector 200 of FIGS. 2A-B, is covered with a hydrophilic gel, as illustrated by hydrophilic gel 108 of FIGS. 1A-C, and hydrophilic gel 207 of FIGS. 2A-B. In block 302, an electrical bias is applied to the corrosive substance detector, and the resistance of each of the detector structures in the corrosive substance detector is monitored. The electrical bias may comprise a DC bias in some embodiments. In embodiments corresponding to corrosive substance detector 100 of FIGS. 1A-C, the DC bias may be applied across terminals 107 and 113, and a resistance of each detector structure 103-106 may be monitored via a respective test pad 109-112. In embodiments corresponding to corrosive substance detector 200 of FIGS. 2A-B, the DC bias may be applied across power terminals 208, 210, 212, and 214, and ground terminals 209, 211, 213, and 215. In some embodiments, the DC bias may be relatively small (e.g., about 100 microamperes; about 2.5 volts). The DC bias may be any appropriate voltage that is available in the electronic device that includes the corrosive substance detector in various embodiments.

In block 303, it is determined whether a resistance of any detector structure in the corrosive substance detector is below a minimum resistance (Rmin) If it is determined in block 303 that none of the detector structures in the corrosive substance detector have a resistance below Rmin, flow proceeds back to block 302, and the resistances of the detector structures continue to be monitored.

When it is determined in block 303 that one or more detector structures in the corrosive substance detector have a resistance below Rmin, flow proceeds to block 304, and an amount of exposure to a corrosive substance (e.g., sulfur, chlorine, and/or nitrogen oxide) is indicated based on identification of the particular detector structure(s) that have the resistance below Rmin A course of action may be recommended to be taken with respect to the electronic device based on the determined amount of corrosive substance exposure. In some embodiments, a warning corresponding to the determined amount of corrosive substance exposure, and/or a recommended course of action, may be displayed to a user via any appropriate display device in block 304. For example, detector structure 103 of corrosive substance detector 100 and detector structure 203 of corrosive substance detector 200, each of which has a relatively small gap width (e.g., 0.4 W), being determined to have a resistance below Rmin may indicate a relatively low level of corrosion. Therefore, in some embodiments, a preventative action, such as cleaning an air intake area, may be taken in block 304 based on the resistance of detector structure 103 or 203 falling below Rmin. Further, detector structure 104 of corrosive substance detector 100 and detector structure 204 of corrosive substance detector 200, each of which has a larger gap width (e.g., 0.6 W), being determined to have a resistance below Rmin may indicate a higher level of corrosion. Therefore, in some embodiments, a corrective action, such as cleaning or replacing parts or inventory, may be taken in block 304 based on the resistance of detector structure 104 or 204 falling below Rmin. Further, detector structure 105 of corrosive substance detector 100 and detector structure 205 of corrosive substance detector 200, each of which has a larger gap width (e.g., 0.8 W), being determined to have a resistance below Rmin may indicate an even higher level of corrosion. Therefore, in some embodiments, immediate action, such removing the system into a cleaner environment, may be taken in block 304 based on the resistance of detector structure 105 or 205 falling below Rmin. Further, detector structure 106 of corrosive substance detector 100 and detector structure 206 of corrosive substance detector 200, each of which has a largest gap width (e.g., W), having a resistance below Rmin may indicate a highest level of corrosion. Therefore, in some embodiments, emergency action, such as data evacuation or system shut down, may be taken in block 304 based on the resistance of detector structure 105 or 205 falling below Rmin. Further, maintenance, such as checking for server parts that need replacement, replacing the corrosive substance detector, and cleansing the environment area may be performed in block 304 based on the resistance of any detector structure dropping below Rmin.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
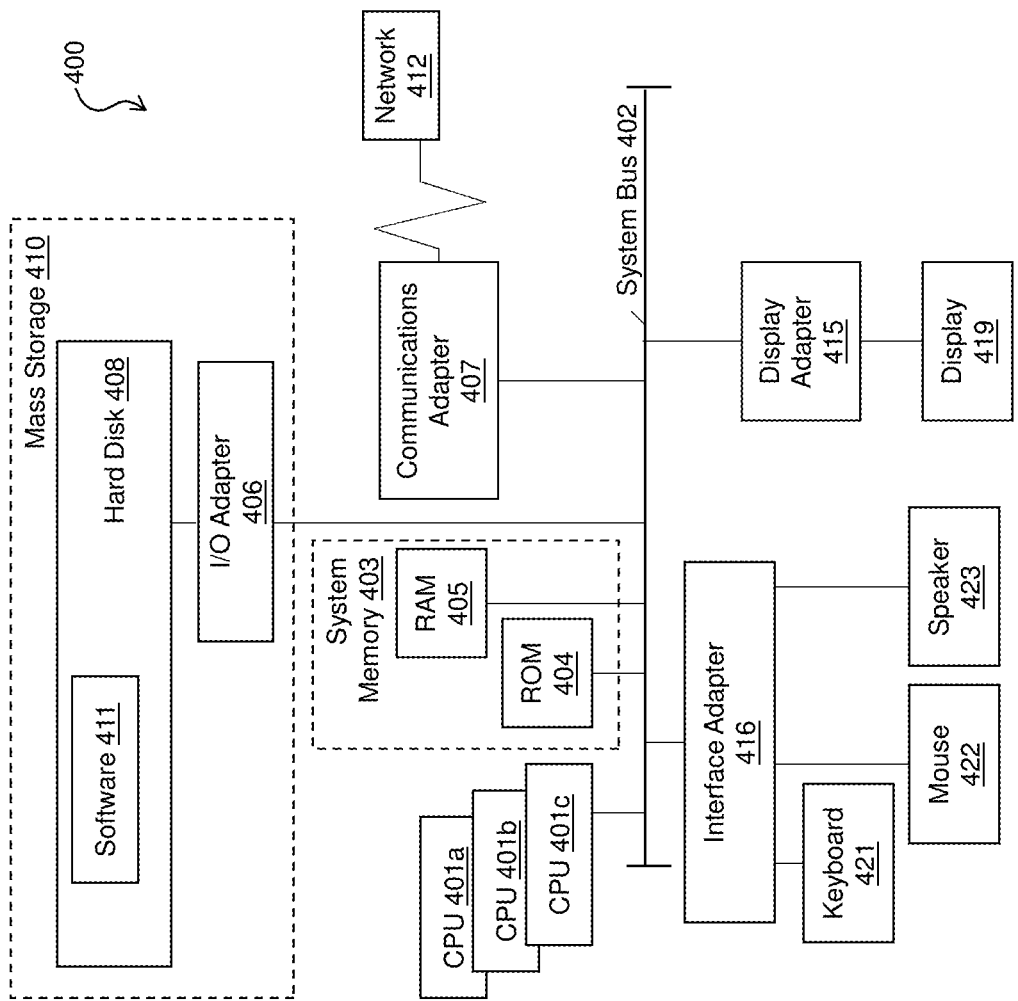
FIG. 4 is a block diagram of an example computer system for use in conjunction with one or more embodiments of corrosive substance detection.

Turning now to FIG. 4, a computer system 400 is generally shown in accordance with an embodiment. The computer system 400 can be an electronic, computer framework comprising and/or employing any number and combination of computing devices and networks utilizing various communication technologies, as described herein. The computer system 400 can be easily scalable, extensible, and modular, with the ability to change to different services or reconfigure some features independently of others. The computer system 400 may be, for example, a server, desktop computer, laptop computer, tablet computer, or smartphone. In some examples, computer system 400 may be a cloud computing node. Computer system 400 may be described in the general context of computer system executable instructions, such as program modules, being executed by a computer system. Generally, program modules may include routines, programs, objects, components, logic, data structures, and so on that perform particular tasks or implement particular abstract data types. Computer system 400 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system 400 has one or more central processing units (CPU(s)) 401a, 401b, 401c, etc. (collectively or generically referred to as processor(s) 401). The processors 401 can be a single-core processor, multi-core processor, computing cluster, or any number of other configurations. The processors 401, also referred to as processing circuits, are coupled via a system bus 402 to a system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the computer system 400. The RAM is read-write memory coupled to the system bus 402 for use by the processors 401. The system memory 403 provides temporary memory space for operations of said instructions during operation. The system memory 403 can include random access memory (RAM), read only memory, flash memory, or any other suitable memory systems.

The computer system 400 comprises an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410.

Software 411 for execution on the computer system 400 may be stored in the mass storage 410. The mass storage 410 is an example of a tangible storage medium readable by the processors 401, where the software 411 is stored as instructions for execution by the processors 401 to cause the computer system 400 to operate, such as is described herein below with respect to the various Figures. Examples of computer program product and the execution of such instruction is discussed herein in more detail. The communications adapter 407 interconnects the system bus 402 with a network 412, which may be an outside network, enabling the computer system 400 to communicate with other such systems. In one embodiment, a portion of the system memory 403 and the mass storage 410 collectively store an operating system, which may be any appropriate operating system, such as the z/OS or AI4 operating system from IBM Corporation, to coordinate the functions of the various components shown in FIG. 4.

Additional input/output devices are shown as connected to the system bus 402 via a display adapter 415 and an interface adapter 416. In one embodiment, the adapters 406, 407, 415, and 416 may be connected to one or more I/O buses that are connected to the system bus 402 via an intermediate bus bridge (not shown). A display 419 (e.g., a screen or a display monitor) is connected to the system bus 402 by a display adapter 415, which may include a graphics controller to improve the performance of graphics intensive applications and a video controller. A keyboard 421, a mouse 422, a speaker 423, etc. can be interconnected to the system bus 402 via the interface adapter 416, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 4, the computer system 400 includes processing capability in the form of the processors 401, and, storage capability including the system memory 403 and the mass storage 410, input means such as the keyboard 421 and the mouse 422, and output capability including the speaker 423 and the display 419.

In some embodiments, the communications adapter 407 can transmit data using any suitable interface or protocol, such as the internet small computer system interface, among others. The network 412 may be a cellular network, a radio network, a wide area network (WAN), a local area network (LAN), or the Internet, among others. An external computing device may connect to the computer system 400 through the network 412. In some examples, an external computing device may be an external webserver or a cloud computing node.

It is to be understood that the block diagram of FIG. 4 is not intended to indicate that the computer system 400 is to include all of the components shown in FIG. 4. Rather, the computer system 400 can include any appropriate fewer or additional components not illustrated in FIG. 4 (e.g., additional memory components, embedded controllers, modules, additional network interfaces, etc.). Further, the embodiments described herein with respect to computer system 400 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the users computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method comprising:
applying an electrical bias to a detector structure of a corrosive substance detector, wherein a layer of a hydrophilic gel is located over an electrode of the detector structure;
monitoring a resistance of the detector structure; and
based on determining that the resistance of the detector structure has dropped below a minimum resistance, indicating corrosion of the electrode resulting from exposure to a corrosive substance by the corrosive substance detector.

2. The method of claim 1, wherein the hydrophilic gel comprises one of polyacrylamide, hydrogel, and active gel.

3. The method of claim 1, wherein exposure to the corrosive substance comprises exposure to at least one of sulfur, chlorine, and nitrogen oxide; and
wherein an increase in a concentration of the corrosive substance in the hydrophilic gel induces an increase in a conductivity of the hydrophilic gel, such that a leakage current in the detector structure is increased by the increase in the conductivity of the hydrophilic gel.

4. The method of claim 1, wherein the corrosive substance detector is located on a base of an electrical device comprising one of a computer chip and a printed circuit board, the base comprising a dielectric material; and
wherein the detector structure comprises a conductive metal that corrodes in the presence of the corrosive substance;
wherein the conductive metal is patterned on the base such that the detector structure comprises a gap in the conductive metal, and the layer of the hydrophilic gel covers the gap; and
wherein the detector structure comprises one or more contacts, and the layer of the hydrophilic gel does not cover the one or more contacts.

5. The method of claim 4, wherein the corrosive substance detector comprises a plurality of detector structures, and wherein each of the plurality of detector structures has a respective gap width corresponding to detection of a respective level of exposure to the corrosive substance.

6. The method of claim 5, wherein a first detector structure of the plurality of detector structures has a first gap width corresponding to detection of a first level of exposure to the corrosive substance;
wherein a second detector structure of the plurality of detector structures has a second gap width that is less than the first gap width, corresponding to detection of a second level of exposure to the corrosive substance, wherein the second level is less than the first level;
wherein a third detector structure of the plurality of detector structures has a third gap width that is less than the second gap width, corresponding to detection of a third level of exposure to the corrosive substance, wherein the third level is less than the second level; and
wherein a fourth detector structure of the plurality of detector structures has a fourth gap width that is less than the third gap width, corresponding to detection of a fourth level of exposure to the corrosive substance, wherein the fourth level is less than the third level.

7. The method of claim 1, wherein the electrode of the detector structure is interdigitated.

8. A corrosive substance detector, comprising:
a base comprising a dielectric material;
a conductive metal that corrodes in the presence of a corrosive substance, wherein the conductive metal is patterned over the base, wherein the conductive metal is patterned to form a detector structure comprising a gap in the conductive metal; and
a layer of a hydrophilic gel located over an electrode of the detector structure, wherein the layer of the hydrophilic gel covers the gap.

9. The corrosive substance detector of claim 8, wherein the hydrophilic gel comprises one of polyacrylamide, hydrogel, and active gel.

10. The corrosive substance detector of claim 8, wherein, based on the corrosive substance detector being exposed to a corrosive substance comprising at least one of sulfur, chlorine, and nitrogen oxide, an increased concentration of the corrosive substance in the hydrophilic gel induces an increase in a conductivity of the hydrophilic gel, such that a leakage current in the detector structure is increased by the increase in the conductivity of the hydrophilic gel.

11. The corrosive substance detector of claim 8, wherein the detector structure comprises one or more contacts, and wherein the layer of the hydrophilic gel does not cover the one or more contacts.

12. The corrosive substance detector of claim 8, wherein the corrosive substance detector comprises a plurality of detector structures, and wherein each of the plurality of detector structures has a respective gap width corresponding to detection of a respective level of exposure to a corrosive substance.

13. The corrosive substance detector of claim 12, wherein a first detector structure of the plurality of detector structures has a first gap width corresponding to detection of a first level of exposure to the corrosive substance;
wherein a second detector structure of the plurality of detector structures has a second gap width that is less than the first gap width, corresponding to detection of a second level of exposure to the corrosive substance, wherein the second level is less than the first level;
wherein a third detector structure of the plurality of detector structures has a third gap width that is less than the second gap width, corresponding to detection of a third level of exposure to the corrosive substance, wherein the third level is less than the second level; and
wherein a fourth detector structure of the plurality of detector structures has a fourth gap width that is less than the third gap width, corresponding to detection of a fourth level of exposure to the corrosive substance, wherein the fourth level is less than the third level.

14. The corrosive substance detector of claim 12, wherein the level of exposure to the corrosive substance is determined based on a resistance of the detector structure in response to application of an electrical bias to the detector structure.

15. A method, comprising:
   forming a detector structure of a corrosive substance detector on a base of an electrical device, wherein the detector structure comprises copper that is patterned on the base such that the detector structure comprises a gap in the copper; and
   applying a layer of a hydrophilic gel over an electrode of the detector structure, wherein the layer of the hydrophilic gel covers the gap.

16. The method of claim 15, wherein the hydrophilic gel comprises one of polyacrylamide, hydrogel, and active gel.

17. The method of claim 15, wherein the electrical device comprises one of a computer chip and a printed circuit board, and the base comprises a dielectric material; and further comprising:
   applying an electrical bias to the detector structure;
   monitoring a resistance of the detector structure;
   based on determining that the resistance of the detector structure has dropped below a minimum resistance, indicating exposure to a corrosive substance by the corrosive substance detector.

18. The method of claim 17, wherein exposure to the corrosive substance comprises exposure to at least one of sulfur, chlorine, and nitrogen oxide; and
   wherein an increase in a concentration of the corrosive substance in the hydrophilic gel induces an increase in a conductivity of the hydrophilic gel, such that a leakage current in the detector structure is increased by the increase in the conductivity of the hydrophilic gel.

19. The method of claim 18, wherein the corrosive substance detector comprises a plurality of detector structures, and wherein each of the plurality of detector structures has a respective gap width corresponding to detection of a respective level of exposure to the corrosive substance.

20. The method of claim 15, wherein the detector structure comprises one or more contacts, and the layer of the hydrophilic gel is applied such that the hydrophilic gel does not cover the one or more contacts.

\* \* \* \* \*